United States Patent [19]
Broekhuijsen

[11] Patent Number: 6,064,974
[45] Date of Patent: May 16, 2000

[54] METHOD AND SYSTEM FOR MONITORING THE STATUS OF A LIMITED RESOURCE

[75] Inventor: Jerome Augustine Broekhuijsen, Highland, Utah

[73] Assignee: Novell, Inc., Provo, Utah

[21] Appl. No.: 08/866,532

[22] Filed: May 30, 1997

[51] Int. Cl.[7] .................................................. G06F 17/60
[52] U.S. Cl. ........................................................ 705/8
[58] Field of Search .................... 705/8, 9, 11; 345/115, 345/114, 146, 133; 707/102, 104

[56] References Cited

U.S. PATENT DOCUMENTS

| | | | |
|---|---|---|---|
| 4,555,775 | 11/1985 | Pike | 364/900 |
| 4,937,743 | 6/1990 | Rassman et al. | 364/401 |
| 5,050,077 | 9/1991 | Vincent | 364/401 |
| 5,197,000 | 3/1993 | Vincent | 364/401 |
| 5,247,438 | 9/1993 | Subas et al. | 364/400 |
| 5,323,314 | 6/1994 | Baber et al. | 364/401 |
| 5,412,772 | 5/1995 | Monson | 395/155 |
| 5,428,738 | 6/1995 | Carter et al. | 395/161 |
| 5,570,109 | 10/1996 | Jenson | 345/146 |
| 5,601,432 | 2/1997 | Bergman | 434/118 |

OTHER PUBLICATIONS

"CEBUS—Office–Software (Product Overview)", CEBUS–Software GmbH, no later than Mar. 19, 1997.
"Product Info. FastTrack Schedule 4.01 Windows Product Description", AEC Software, Inc., no later than Mar. 19, 1997.
"webcal™ The World Wide Web Calendar", no later than Mar. 19, 1997.
"Now Up–to–Date 1.5 for Windows", Now Software, no later than Mar. 19, 1997.
"TaskTimer 3.0", Time/system International a/s (1995–96), Mar. 7, 1997.
"From Plan to Activities—Activity Tracker 1.0 for Wondows will help you keep track", Time/system International a/s (1995–96), Mar. 3, 1997.
"Personal Time Manager (PTM)", Softrise SA (1996), no later than Mar. 19, 1997.
"iambic Software Announces TimeReporter Time and Expense Tracking Software for Windows CE Platform", Vidal Graupera et al., Nov. 18, 1996.
"Microsoft® Team Manager 97", Microsoft Corporation (1997), Oct. 1996.
"Team Manager 97 Data Sheet", Microsoft Corporation (1997), no later than Apr. 1, 1997.
"Quik Info: Inside Microsoft Outlook 97", Microsoft Corporation (1997), no later than Apr. 1, 1997.

(List continued on next page.)

*Primary Examiner*—Frantzy Poinvil
*Attorney, Agent, or Firm*—Computer Law++

[57] ABSTRACT

Methods and systems are provided for monitoring the status of a limited resource. Artificial and misleading distinctions based on different views of a single underlying resource are avoided. For instance, tasks and appointments are both treated as events which place demands on a user's time. Resource status is manifested using intuitive visual interfaces. For instance, variations in color saturation manifest changes in the extent to which a user's time is heavily or lightly scheduled.

58 Claims, 6 Drawing Sheets

OTHER PUBLICATIONS

"One Window to Your World of Information", Microsoft Corporation (1997), no later than Apr. 1, 1997.

"The New Electronic Day Planner", Product Literature, Franklin Quest Co. (1996).

"Introducing ASCEND® 97", Product Literature, Franklin Quest Co.

"3–D Glossary", Byte (1994–1997), no later than May 12, 1997.

Sarah Douglas et al., "Do Color Models Really Make a Differance?", *Human Factors in Computing Systems, Common Ground Chi 96 Conference Proceedings*, Apr. 13–18, 1996, pp. 399–405.

"Pencil Me In® 3.0", Sarrus Software, Inc. (1996), no later than Mar. 19, 1997.

"Pencil Me In® for Java™", Product Literature, Sarrus Software, Inc. (1996), no later than Mar. 22, 1997.

Edward R. Tufte, Envisioning Information (1990), p. 89.

Jimmy Guterman, "Envisioning Interfaces", no later than Apr. 23, 1997.

David Weinberger, "In Your Interface", Wired Ventures Ltd. (1995), no later than Apr. 23, 1997.

Chris Yarvin, "Scripting Languages", Wired Ventures Ltd. (1995), no later than Apr. 23, 1997.

Jef Raskin, "Down With GUIs!", Wired Ventures Ltd. (1995), no later than Apr. 23, 1997.

Chris Oakes, "Wired News: Bye–Bye, Browser—Hello, OS", Mar. 28, 1997.

"Concepts of User Interface Design", Common Front Group, no later than Apr. 23, 1997.

"Some Background on User Interfaces", Common Front Group, no later than Apr. 23, 1997.

"The Process of User Interface Design", Common Front Group, no later than Apr. 23, 1997.

"Beyond The Desktop, Part One of the FEED Dialog on Interface Design", Dialog Digital Thinking, no later than Apr. 25, 1997.

"Beyond The Desktop, Part Two of the FEED Dialog on Interface Design", Dialog Digital Thinking, no later than Apr. 25, 1997.

"Scientific Visualization Sites", NASA, Mar. 18, 1997.

"Research Papers:", The Geometry Center Home Page, Aug. 27, 1996.

METHOD AND SYSTEM FOR MONITORING THE STATUS OF A LIMITED RESOURCE

FIELD OF THE INVENTION

The present invention relates to systems and methods for monitoring the status of a limited resource, and more particularly to an improved approach to tracking user time in calendaring and scheduling software.

TECHNICAL BACKGROUND OF THE INVENTION

People have long sought efficient, intuitive ways to move information in and out of computers. Each step in the development of computer interfaces brings the level of discourse closer to the sights and sounds people use to communicate with one another. But progress in computer interfaces has been intermittent and very difficult.

Early computers used toggle switches to receive data and instructions, and displayed computational results by flashing particular light patterns in one or more rows of lights. Errors were easy to make and hard to detect, because people were forced to adapt to the machine's abilities instead of making the computer communicate in the flexible ways familiar to people.

After computers were improved to include video screens and keyboards, text messages to the machine could be sent using the keyboard, and output could be displayed on the video screen. This was an enormous improvement because it allowed the use of a written language. Familiar examples of such textual interfaces still used today include the command interpreters of the DOS and UNIX operating systems.

Unfortunately, textual interfaces leave much to be desired. Each textual interface is confined by a rigid grammar and a limited vocabulary. A user must learn key words for even the simplest commands. Very little about the interface is intuitive. For example, to find the amount of disk space that is available on a given machine using the DOS operating system, "dir" is typed and the number of available "bytes" is then displayed.

Recently developed graphical user interfaces (GUIs) are much easier to use. Familiar GUIs include those in word processors, spreadsheets, operating systems, programming packages, graphic design programs, Internet applications, and other software. GUIs typically display textual and graphical output in windows, and accept input from at least a mouse and a keyboard. Unlike textual interfaces, which required the user to already know each desired command, GUIs allow the user to review a menu of available commands. GUIs may also include graphical icons which suggest the purpose of a button or other interface component.

Efforts to improve interfaces reflect the value of a good interface. Many increases in the power and usefulness of modern personal computers started with increases in processor power, memory, and disk storage capacity. But these resources are only useful to the extent that they are efficiently available through a good interface.

To efficiently utilize computer system resources, a computer user must track resource usage. Unfortunately, many resource management interfaces are still textual, requiring users to interpret numbers instead of making the interface communicate resource status in some way that is more intuitive. Even GUI resource manager interfaces typically provide only a "snapshot" of the current resource status, and provide that only after the user clicks several buttons or otherwise actively requests a status update.

Some resource managers provide graphical data presentations similar to the charts found in spreadsheet and other graphing programs. Frequently used charts include column, line, pie, histogram, and scatter charts in two or more dimensions. While these charts help analyze large, complex collections of data, they still require interpretation. A more intuitive interface would be an advance.

One of the most valuable limited resources is time. Typical scheduling and calendaring application programs allow users to mark specific blocks of time as "used." But these programs do not quickly communicate how busy a given day will be, because they do not compare the demands on the user's time with the time available to meet those demands. That is, the interfaces do not make it obvious at a glance whether the user's day will be slow, or busy, or that the user is already "over-booked."

Other resources also need to be monitored. Examples include resources associated with meters, televisions, audio and video recorders and players, microwave ovens, telephones, washing machines, and other machines. Interfaces for controlling such resources may appear on very small screens, so it would be helpful to have a method to display resource status compactly and intuitively.

In short, although humans can appreciate very fine changes in what we see and hear, typical program interfaces do not take full advantage of these abilities. For example, current calendaring programs indicate allocated time by coloring a rectangle with one of two colors, depending on whether the corresponding block of time is allocated. At the most, a few different kinds of events are colored with a few different colors.

It would therefore be an advancement in the art to provide a novel computer interface for tracking resource status.

It would be an additional advancement to provide such an interface which exploits our natural ability to discern subtle changes in the characteristics of a color.

It would also be an advancement to provide a novel interface which extends existing interfaces and can be used together with existing interface components.

Such an interface is disclosed and claimed herein.

BRIEF SUMMARY OF THE INVENTION

The present invention provides methods and systems for monitoring limited resources. The invention may be used to monitor a wide variety of limited resources. One embodiment of time management (calendaring/scheduling) software according to the invention avoids two problems found in conventional software, namely, an artificial distinction between tasks and appointments, and an undue cognitive burden placed on the user to assess the relative flexibility in the user's schedule.

The artificial distinction between tasks and appointments is reflected in the way information about tasks and appointments is stored, manipulated, and presented to users. Conventional approaches appear to draw upon two separate resources. But in fact, tasks and appointments both draw on a single resource: one's time.

To illustrate the potential problem, consider the case in which User A has no appointments scheduled for a given day, but five tasks requiring two hours each that must be finished by the end of that day. User B wishes to meet with User A and performs a "busy search." The search incorrectly shows that User A is available for a meeting that day, so User B schedules the meeting. User A is then overbooked.

Current solutions are unsatisfactory. User A should not be required to explicitly put "appointments" into his or her own schedule to allow sufficient time to complete the tasks, because the flexible nature of tasks is lost and the process is quite tedious and error-prone. Nor should user A be required to miss meetings or fail to complete tasks.

In one embodiment of the present invention, tasks and appointments are unified by treating them as special cases of an event. Each event has a required time and an available time. An event density is produced which reflects the busyness of the user's planned day in terms both of tasks and appointments.

Another innovative aspect of the present invention provides an intuitive interface for tracking changes in event density or other indicators of resource status. In one embodiment, changes in resource status are manifested by corresponding changes in a color saturation displayed on a computer monitor. As a region representing a day, for instance, becomes busier, the color displayed in that region becomes more saturated. This allows users to sense at a glance approximately how hectic their planned day will be.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and system for monitoring the status of a limited resource in a computer system. The resource may be a computer resource such as memory or disk space, or the resource may be a user resource such as time.

The invention may be used with individual computers, with suitable networks, or both. Suitable include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, servers, or a combination thereof. The network may include one or more LANs, wide-area networks, Internet servers and clients, intranet servers and clients, or a combination thereof.

Figure 1:
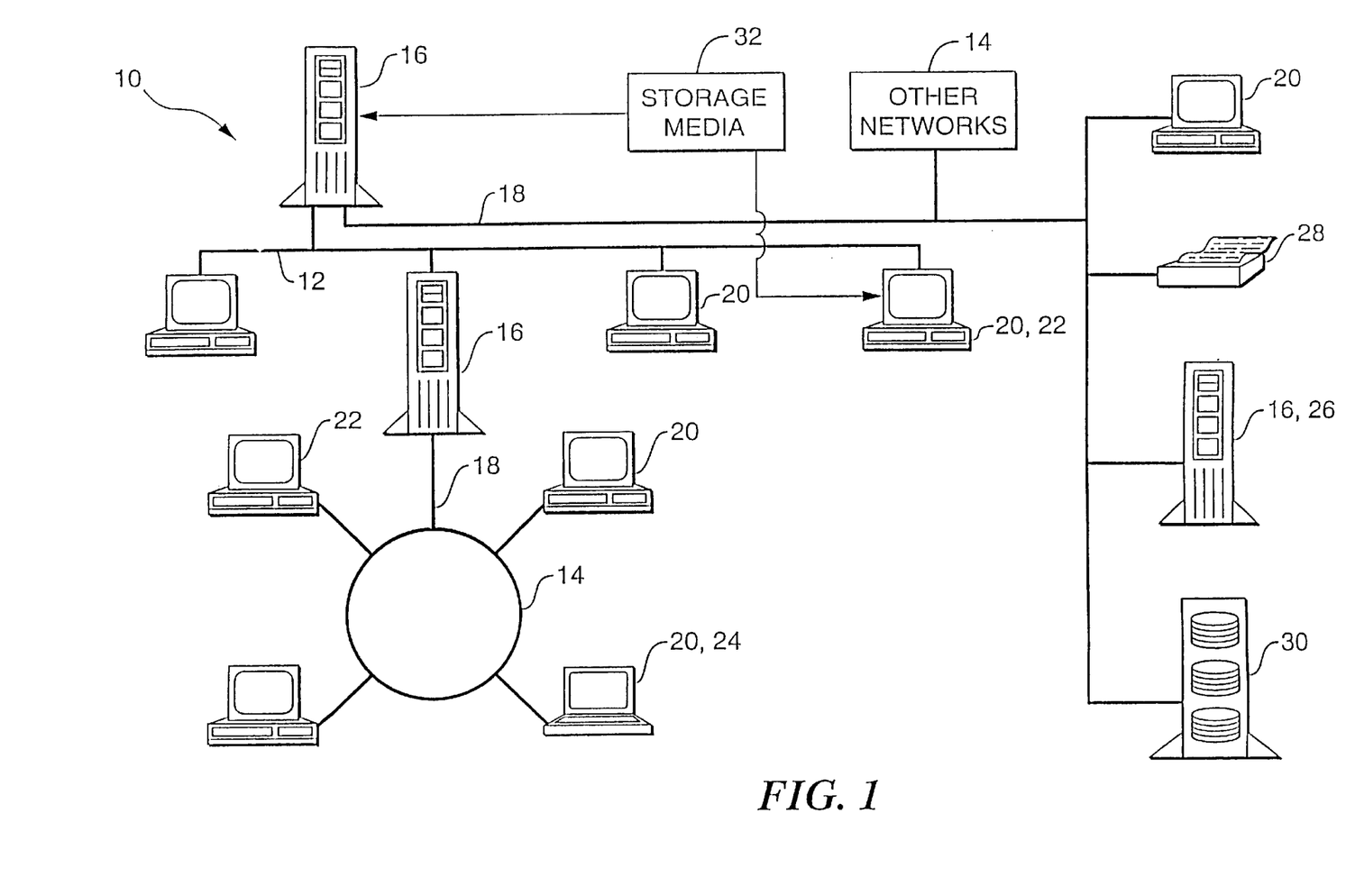
FIG. 1 is a diagram illustrating a network of computers which are individually and collectively among the many systems suitable for use with the present invention.

One of the computer systems suited for use with the present invention is indicated generally at 10 in FIG. 1. In one embodiment, the system 10 includes Novell NetWare® network operating system software (NETWARE is a registered trademark of Novell, Inc.). In alternative embodiments, the system 10 includes NetWare Connect Services, VINES, Windows NT, Windows 95, LAN Manager, or LANtastic network operating system software and/or an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft). The system 10 may include a local area network 12 which is connectable to other networks 14, including other LANs or portions of the Internet or an intranet, through a gateway or similar mechanism.

The system 10 includes several servers 16 that are connected by network signal lines 18 to one or more network clients 20. The servers 16 and network clients 20 may be configured by those of skill in the art in a wide variety of ways to operate according to the present invention. The servers 16 may be configured as Internet servers, as intranet servers, as directory service providers or name servers, as software component servers, or as a combination thereof. The servers 16 may be uniprocessor or multi-processor machines. The servers 16 and clients 20 each include an addressable storage medium such as random access memory and/or a non-volatile storage medium such as a magnetic or optical disk.

Suitable network clients 20 include, without limitation, personal computers 22, laptops 24, workstations 26, and dumb terminals. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the system 10. A given computer may function both as a client 20 and as a server 16; this may occur, for instance, on computers running Microsoft Windows NT software. Although particular individual and network computer systems and components are shown, those of skill in the art will appreciate that the present invention also works with a variety of other networks and computers.

The servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, random access memory, and other computer system storage devices. The substrate configuration represents data and instructions which cause the computer system to operate in a specific and predefined manner as described herein. Thus, the medium 32 tangibly embodies a program, functions, and/or instructions that are executable by the servers 16 and/or network client computers 20 to perform resource monitoring steps of the present invention substantially as described herein.

Figure 2:
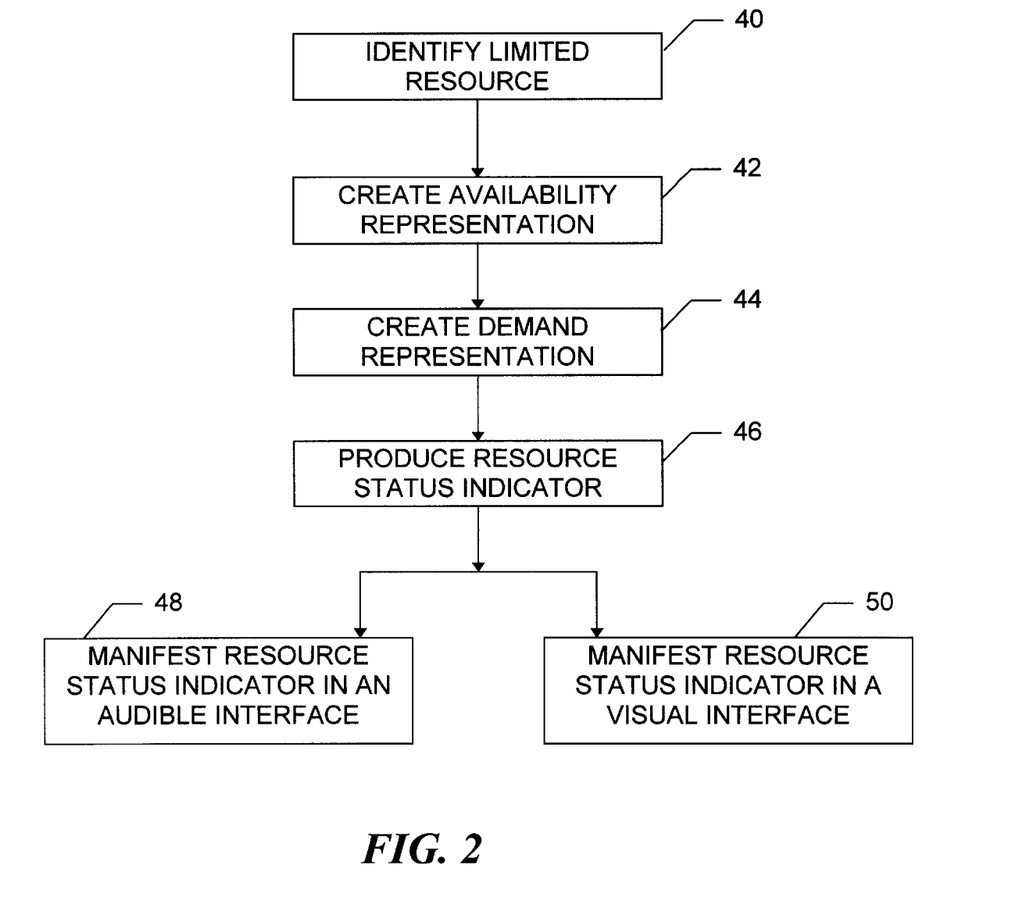
FIG. 2 is a flowchart illustrating a resource status monitoring method of the current invention.

FIG. 2 illustrates a method of the current invention for monitoring a resource status indicator. This and other methods of the invention are embodied in the system 10 or another suitable system or computer using a combination of computer hardware and software. Suitable software is readily provided by those of skill in the art using the teachings presented here and programming languages such as Java, Pascal, C++, C, assembly, firmware, microcode, and/or other languages.

During an identifying step 40, a limited resource is identified. Several suitable choices of limited resources are discussed in connection with FIGS. 3 and 5; a variety of other possible limited resources will be readily determined by those of skill in the art.

The limited resource may be identified by a wide variety of methods, including without limitation: "hard-coding" the resource into computer code that forces one resource to be automatically selected; enabling a user to select the resource from a menu of possible resources; listing the resource in a file that is read by a program according to the invention, such as a configuration file; allowing the user to write code to choose a resource, and so on. In some embodiments, a single resource is identified, while others allow the user to monitor more than one resource.

To illustrate the inventive methods in a particular context, assume that time is identified as the limited resource to be monitored. Ways in which the invention complements and extends conventional software such as calendaring and scheduling software are described below.

During a creating step 42, a representation of the total availability of the limited resource is created in the system 10. The representation is selected both for its expressive nature and for its ease of manipulation by software that embodies the invention. The expressive nature of a smoothly varying continuous representation based on a float or real programming data type is different than the nature of a discrete discontinuous data type such as an enumeration or integer type.

The total availability of the resource may be identified by a wide variety of methods, including without limitation: soliciting and accepting a user specification of the availability of the chosen limited resource; "hard-coding" the availability into computer code; choosing the availability from a menu; using an availability default value, and so on.

For example, the availability of time in a calendaring program could be the time available in a specific day, the time available in a specific week, month, year, or so on. The time available can be chosen from a pop-up menu, placed in a start-up file that is automatically run when the calendaring software runs, and so on. Time may be available only in discrete blocks, such as tenths of an hour, or it may be represented as a continuous real variable.

During a creating step 44, a representation in the computer of the total demand on the limited resource is created. The demand can be determined by a wide variety of methods, including without limitation: allowing the user to specify the amount, allowing the user to specify a method to determine the demand, determining demand using a predetermined algorithm, and so on.

For example, in a calendaring program the time demanded could be the total time already specified for tasks and appointments. It might also be limited to the time specified for tasks, or the time specified for appointments. Time demanded might also be a total reflecting all events that have been rated "important" by the user or by a supervisor.

During a producing step 46, the availability representation and demand representation are combined to produce a resource status indicator that shows the amount of resource demanded relative to the amount of resource available. In a calendaring program, for instance, the availability representation and demand representation might be combined by forming the ratio of demanded time to available time.

With continued reference to FIG. 2, the resource status indicator can be manifested audibly during a step 48 and/or visually during a step 50. To audibly manifest the status indicator, a beep, a musical selection, or an appropriate tone is played or sounded. Visual manifestations are discussed in connection with FIG. 3.

Other steps may also be taken to manifest the resource status indicator, including without limitation: transmitting a file to a remote area across a network, an intranet, or the Internet; setting off an alarm either locally or remotely; changing the tactile value of a material, such as making a surface rougher or smoother; changing the speed or motion of an object, such as varying the speed or path of a transport; providing tactile stimuli such as temperature changes or harmless electric currents conducted to a user, and so on.

Figure 3:
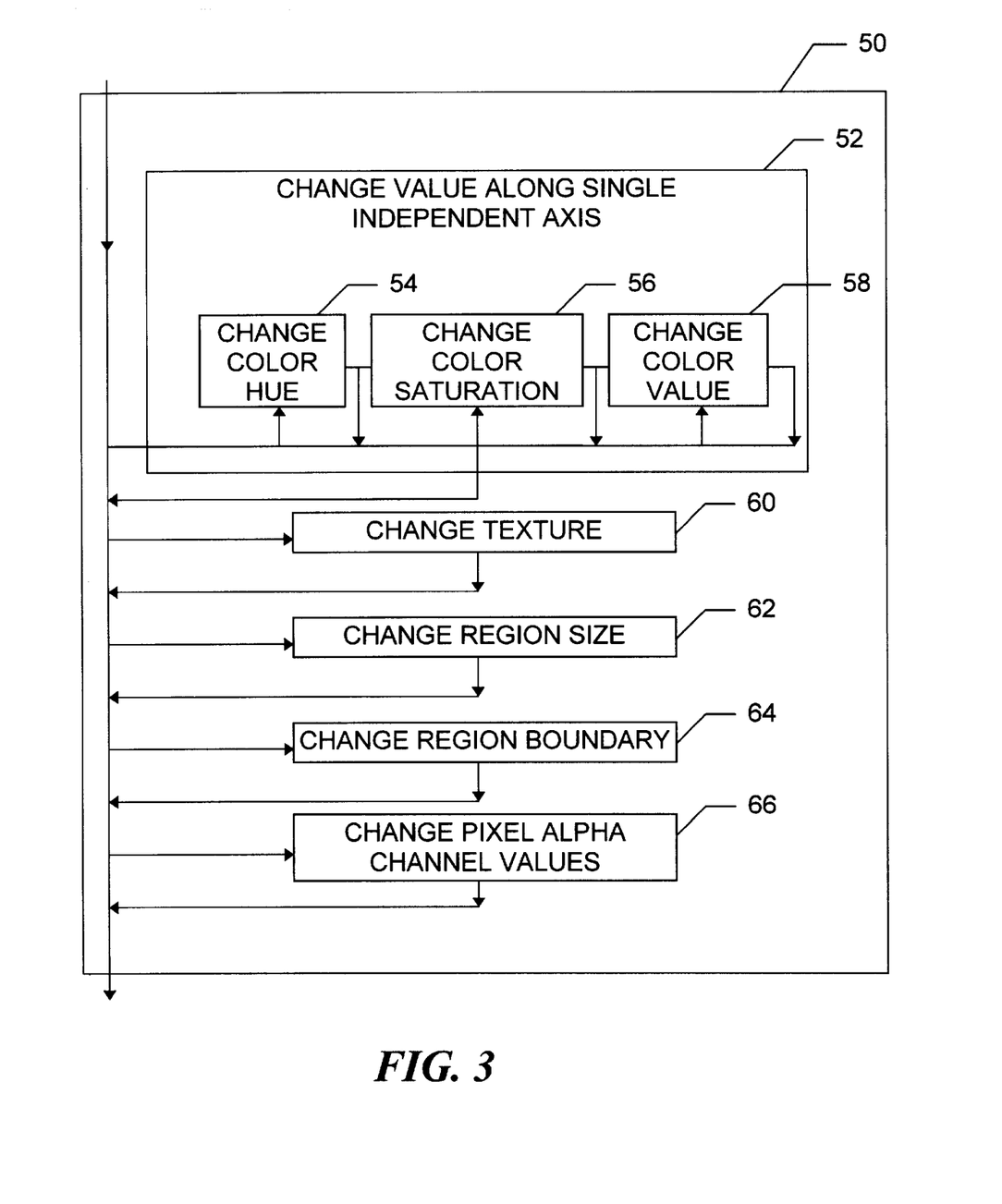
FIG. 3 is a flowchart illustrating a method of the invention for manifesting resource status changes in a visual interface.

FIG. 3 illustrates in detail one approach to the visual manifesting step 50 of FIG. 2. It is well-known that multi-dimensional color selection models organize colors in a multi-dimensional space defined by one or more independent axes. A commonly used color space is the hue-saturation-value (HSV) color space. Other familiar color spaces include, without limitation: the RGB space, whose three axes are red, green and blue; the CMY space, whose three axes are cyan, magenta, and yellow; and the YIQ space, whose three axes are luminance, blue-green/orange balance and yellow-green/magenta balance. Although the examples given all have three axes, those of skill in the art will recognize that a color space may also have a different number of axes.

A changing step 52 of the invention changes a visual value along a single independent axis of a color space. In one embodiment, values may be changed along any one of the independent axes. For instance, in the HSV model, a step 54 changes color hue, a step 56 changes color saturation, and a step 58 changes color value. The steps 54, 56, and 58 may be used alone or in combination in a given program operating according to the invention.

Returning to the calendaring software example, each task and each appointment on a user's calendar is an event. Each event has a required time and an available time. An "event density" fraction is produced during step 46 (FIG. 2) by computing the demanded time divided by the available time. For appointments, the demanded time and available time are equal, so the event density is 1.0. For tasks, the available time exceeds the demanded time, so the event density is less than 1.0 but generally greater than 0.0. A task may be treated as an appointment if the time available is decreased until it equals the time demanded. Similarly, an appointment may be treated as a task if the time available increases beyond the time demanded.

Monitoring such tasks and appointments is achieved by representing them as events in the same time stream and by mapping specific color attributes to them in a user interface in the system 10 (FIG. 1). An event has a particular (H,V) pair assigned to it according to some convention or preference. The S value is mapped to a density fraction such as the event density described above, where a density of 1.0 corresponds to a fully saturated color and a density of 0.0 corresponds to a completely unsaturated color.

Shown below are example manifestations which animate a transition in a spatial boundary and a corresponding color saturation, using the familiar Mathematica software environment:

```
// This shows the same color (H,V) and varies the
saturation...
Do[Show[Graphics[{Hue[.65,1-s,1],Rectangle[{0,0},{s,1}],Hue[
.65,s,1],Rectangle[{s,0},{1,1}]}]],{s,.2,.8,.02}]
Do[Show[Graphics[{Hue[.65,1-s,1],Rectangle[{0,0},{s,1}],Hue[
.65,s,1],Rectangle[{s,0}, {1,1}]}]],{s,.8,.2,-.02}]
// This shows different colors (H,V) and varies the
saturation...
Do[Show[Graphics[{Hue[.3,1-s,1],Rectangle[{0,0},{s,1}],Hue[.
7,s,1],Rectangle[{s,0},{1,1}]}]],{s,.2,.8,.02}]
Do[Show[Graphics[{Hue[.3,1-s,1],Rectangle[{0,0},{s,1}],Hue[.
7,s,1],Rectangle[{s,0},{1,1}]}]],{s,.8,.2,-.02}]
```

Blocks of time may be represented graphically, with color coding for different events, as in conventional software. However, blocks corresponding to events may also be stretched or compressed to increase or decrease the time available for an event. Appropriate feedback to such manipulations includes remapping the event density to values of S and refilling the graphically represented block of time with the updated (H,S,V) color. The remapping and refilling are preferably done in real-time (perceptibly instantaneous) so as to connote direct control and mapping of manipulations (causes) to modified event densities (effects). Mapping density to saturation effectively shifts a heavily cognitive burden to the perceptual processes of the mind which can process such information more broadly, easily, quickly, and qualitatively.

FIG. 3 also illustrates alternative steps which modify items other than color to indicate a change in a resource status. A step 60 changes a texture using familiar techniques such as texture mapping. For instance, a texture showing a blue sky with white clouds could be replaced by one showing a stormy sky and then by one showing a storm as the density passes predetermined threshold values. More particularly, the storm could appear when the ratio of demand to availability for any resource (network bandwidth, user time, front-row seats, . . . ) passes ninety percent.

A step 62 changes a region size to reflect changes in the resource status. For instance, a "flexibility" region having an area directly proportional to the event density could be displayed.

A step 64 changes a region boundary to reflect changes in the resource status. For instance, the boundary around a rectangular screen region that represents a given day could become increasingly jagged as event density increases.

Finally, a step 66 changes pixel alpha values. The alpha value of a pixel defines its transparency. In one embodiment, a hidden image gradually emerges from the background as the alpha value changes in response to increasing event density; in another, a visible image gradually disappears. For example, as the event density increases, an image of a steaming cup of coffee may emerge, or an image of a paper airplane may fade into the background.

The steps 52 through 66 may be used in combinations or individually. The example changes listed here are only a few of the possible manifestations of event density and other resource status indictors.

Figure 4:
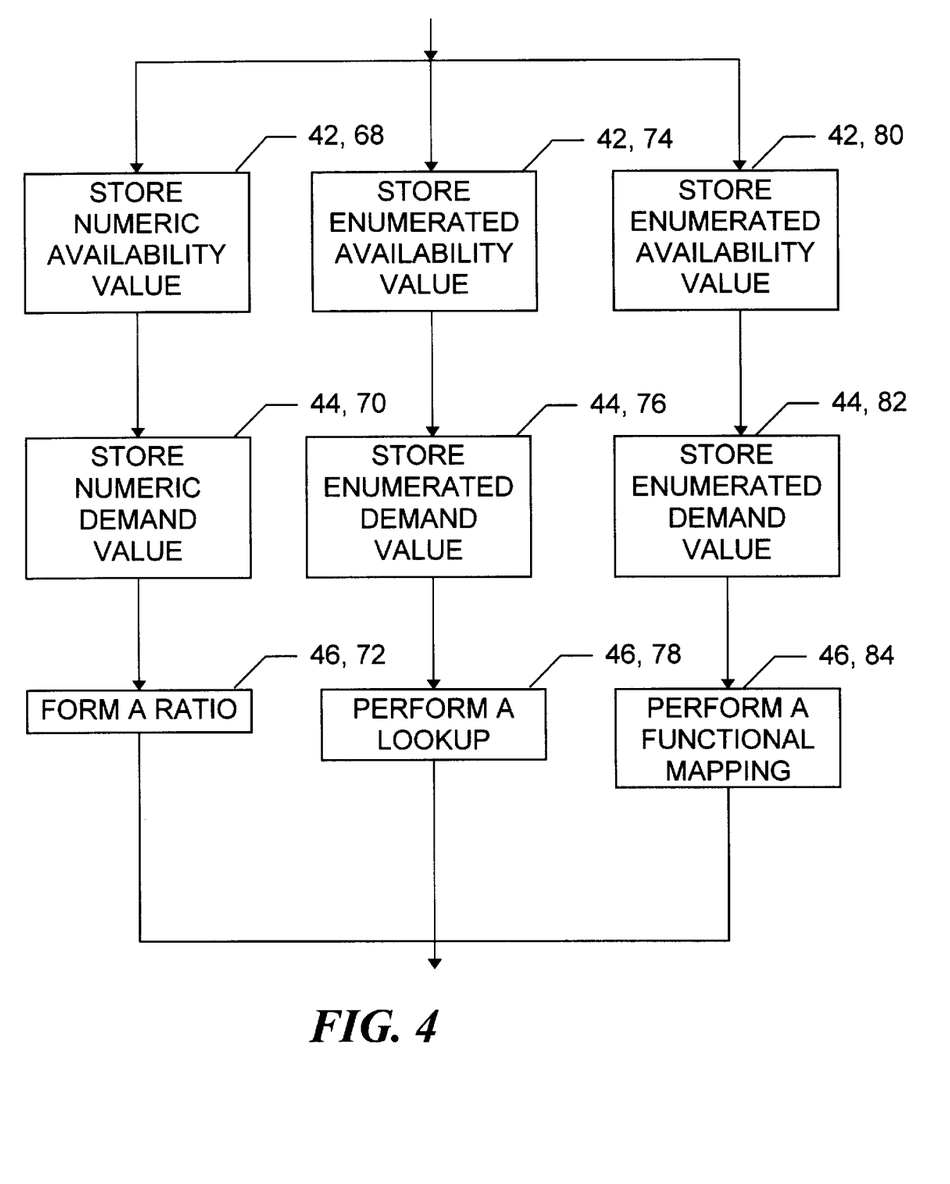
FIG. 4 is a flowchart further illustrating storing and producing steps of the method shown in FIG. 2.

FIG. 4 illustrates alternative forms of the creating step 42, the creating step 44, and the producing step 46 shown in FIG. 2. One method stores the availability value as a number during a step 68, stores the demand value as a number during a step 70, and then forms a ratio of the two numbers during a step 72. For example, in a calendaring program the time available might be 8.0 hours and the time demanded might be 6.0 hours, making the ratio formed equal to 6.0/8.0 (0.75).

An alternative method stores the availability as an enumerated value during a step 74 and similarly stores the demand value as an enumerated value during a step 76. Enumeration types are well-known in the field of computer science as a way of creating and assigning a list of names rather than numbers. The Ada programming language provides enumeration types directly; in other languages, such as C, they are implemented as integer values. During a step 78, the availability and demand values are used as indexes into a lookup table to produce the status indicator. The status indicator may also be stored in the system 10 as an enumeration type, but need not be. For example, in a calendaring program the availability value and the demand value might each be selected from the ordered enumeration set {none, low, medium, high, too high} and the status indicator might be produced using the following approach:

```
if (demanded == none)
    status = VACATION
else if (available >= demanded)
    status = OK
else
    status = OVERLOADED
```

Another method stores the availability as an enumerated value during a step 80, stores the demand value as another enumerated value during a step 82, and then produces the status indicator by performing a functional mapping during a step 84. For instance, in a calendaring program the available time and the demanded time could be discrete variables which change in increments of ¼ hour, and the saturation displayed could also change discretely as a logarithmic function of the event density, so that perceptibly larger changes in saturation occur with lower event densities than with higher densities. Other functions, including continuous and piecewise-continuous functions, hard-coded or user-configurable, may be also employed.

Figure 5:
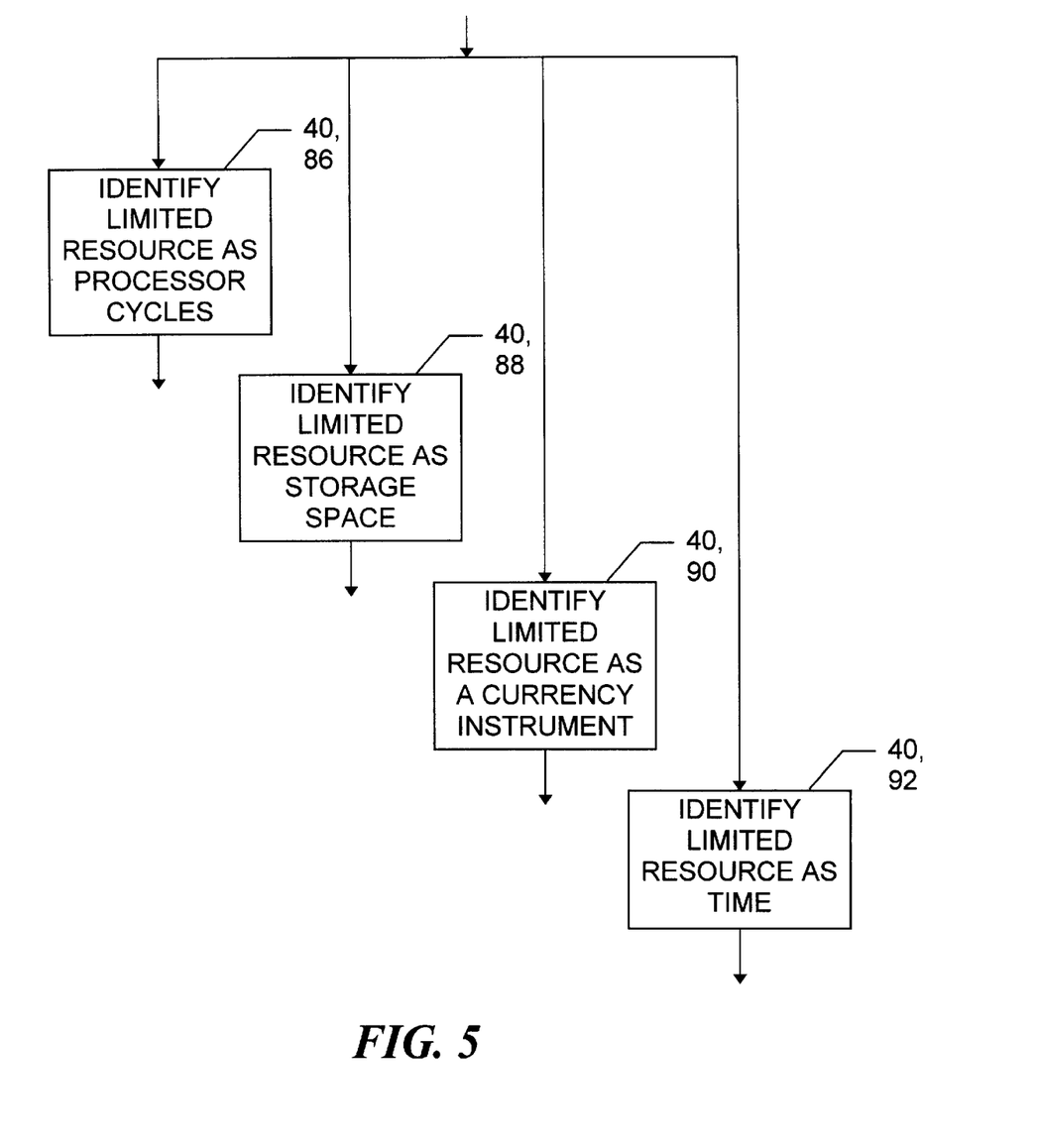
FIG. 5 is a flowchart further illustrating an identifying step of the method shown in FIG. 2.

FIG. 5 illustrates variants of the limited resource identifying step 40 shown in FIG. 2. Those skilled in the art will recognize that many other objects not explicitly mentioned here are also limited resources suitable for being manifested in a resource status indicator.

A step 86 identifies computer processor cycles as the limited resource. These processor instruction cycles represent CPU access on a stand-alone personal computer; a remote server 16 (FIG. 1); a networked collection of processors in the system 10; a multiprocessor or "supercomputer"; a special-purpose processor such as a graphics processor, numeric processor or signal processor; or another computer processor for which available cycles and demanded cycles are monitored.

A step 88 identifies storage space in a memory device as the limited resource. Suitable storage devices include hard disks, random access memory (RAM), floppy disks, WORM (Write Once Read Many) drives, plug-in backup devices, tape, CD-ROMs, PROMs and other computer system storage devices. Available and demanded storage space may each be measured in bits, bytes, words, sectors, blocks, megabytes, disks, or other suitable units.

A step 90 identifies a currency instrument as the limited resource. Currency instruments come in various types, such as stocks, bonds, mutual funds, stock options, money market funds, treasuries, certificates of deposit; groups of stock, such as those listed on the New York Stock Exchange or listed on NASDAQ; futures, futures options; currency of various denominations such as U.S. Dollars, German Deutschmarks, Japanese Yen, French Francs, Swiss Francs, European Union Euros; taxes owed, tax refunds due; accounts receivable, accounts payable; retirement funds, SEP-IRA's; money spent on various budget amounts such as money spent on entertainment, automobiles, housing, utilities, and so on.

A step 92 identifies time as the limited resource. The amount of time available, or time demanded, can be defined many ways: time today; time this week; time this year; time for a period chosen by the user such as "time from 3:00 to 4:00 p.m. on weekdays from May to September."

In a calendaring or scheduling program, tasks and appointments are treated as follows. Time allocated to appointments is treated as a block of time that cannot be changed. For example, a doctor's appointment may be set at 10:00 AM on a certain date. In contrast, a task period of time is much more flexible. "Work on report for 3 hours" can be fit into a 3 hour block, 3 1-hour non-contiguous blocks or some other set of time periods that add up to 3 hours. The time demanded may include time needed for appointments, time needed for tasks, or time needed for both tasks and appointments.

Figure 6:
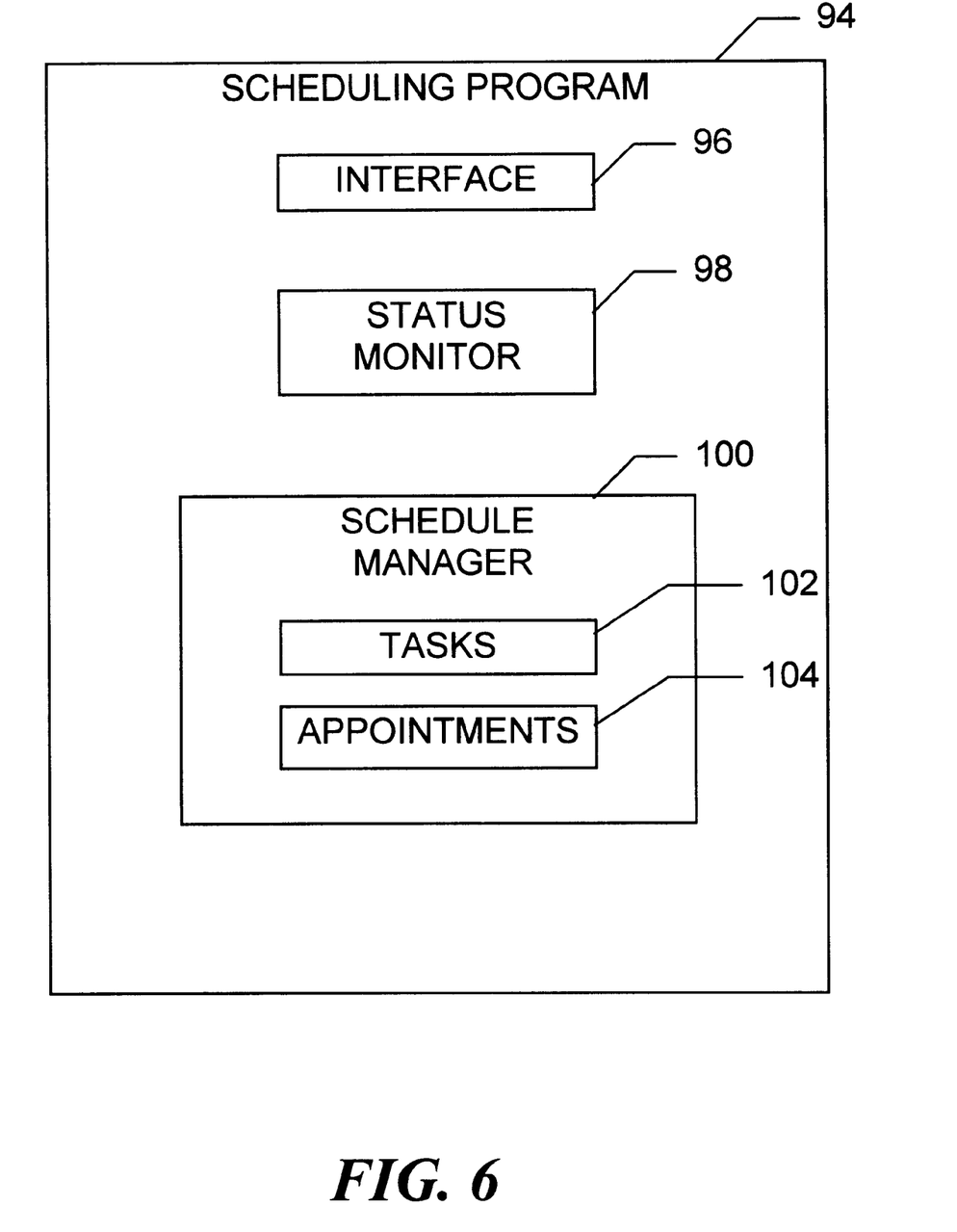
FIG. 6 is a diagram illustrating a scheduling computer program according to the present invention.

FIG. 6 illustrates a scheduling program 94 according to the invention. An interface 96 includes conventional elements such as I/O drivers, and novel elements such as the resource status manifestations discussed in connection with FIGS. 2 and 3. A status monitor 98 provides status information to the interface 96 for manifestation; the status monitor performs at least the producing step 46 (FIG. 2).

A schedule manager 100 performs the representation creating steps 44 and 46 (FIG. 2) based on input from the user and other sources obtained through the interface 96. Other sources may include other instances of the program 94 running on other computers in the system 10 (FIG. 1), and "hard-coded" or configured constraints, such as holidays.

The schedule manager 100 tracks both tasks 102 and appointments 104. In one embodiment, tasks 102 and appointments 104 are represented in separate structures which have the same format. This allows time used for both tasks and appointments to be classified together as time demanded. It also allows tasks to be redefined as appointments and vice-versa.

The interface 96 may manifest the status of a resource in response to a request from the user, or the resource status monitor 98 can automatically update the interface 96 without user input. The automatic update can be performed periodically, or it can be performed after the resource status has changed a specific amount. For example, in a calendaring program the resource status could be recalculated after each hour of time is allocated. The automatic update can also be performed after the resource status has changed by a specific percent. For example, in a currency instrument monitoring program the resource status indicator could be set to recalculate and redisplay each time the currency being measured increases or decreases in value by five percent.

In summary, the present invention provides a novel system and method for monitoring the status of a limited resource such as time or CPU cycles. In monitoring time, appointments and tasks are represented using a single format; similar groupings may be made with other resources, such as by treating both disk capacity and tape capacity as instances of computer readable storage medium capacity. This makes it clear to users which underlying resource is being tracked and helps avoid misunderstandings about resource availability.

The invention also provides an intuitive resource status indicator. Software computes a ratio between the available resource for a given demand, and the required resource for that demand. For instance, the ratio between the available time and the required time for an event such as a task or an appointment is computed. Changes in the ratio are represented in a user interface by changes in color saturation. For instance, as the time available for a given task or appointment approaches the time required, a rectangle representing the task or appointment grows less pale and more visibly intense.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for monitoring resource status based on availability and demand, the method comprising the computer-implemented steps of:

identifying a limited resource;

creating in memory an availability representation which represents the availability of the limited resource;

creating in memory a demand representation which represents the demand for the limited resource; and     producing a resource status indicator by combining the availability representation and the demand representation, wherein the step of creating an availability representation stores a numeric availability value in memory, the step of creating a demand representation stores a numeric demand value in memory, and the producing step forms a ratio from the numeric availability value and the numeric demand value.

2. The method of claim 1, further comprising the step of manifesting the resource status indicator in a visual interface, wherein the manifesting step manifests changes along a single independent axis of a hue-saturation-value multi-axial color space by changing a color saturation in the visual interface to reflect changes in the resource status indicator.

3. The method of claim 1, wherein the manifesting step occurs in response to a user request.

4. The method of claim 3, wherein the manifesting step is repeated automatically to provide a dynamic indication of the status of the limited resource without further user intervention.

5. The method of claim 2, wherein the manifesting step changes a color hue in the visual interface to reflect changes in the resource status indicator.

6. The method of claim 2, wherein the manifesting step changes a color value in the visual interface to reflect changes in the resource status indicator.

7. The method of claim 2, wherein the manifesting step changes a texture in the visual interface to reflect changes in the resource status indicator.

8. The method of claim 2, wherein the manifesting step changes a region size in the visual interface to reflect changes in the resource status indicator.

9. The method of claim 2, wherein the manifesting step changes a region boundary in the visual interface to reflect changes in the resource status indicator.

10. The method of claim 2, wherein the manifesting step changes a pixel alpha channel value in the visual interface to reflect changes in the resource status indicator.

11. The method of claim 13, wherein the identifying step identifies processor cycles as the limited resource, the step of creating an availability representation stores a representation of processor cycles available for use, and the step of creating a demand representation stores a representation of processor cycles which are at least tentatively allocated for use.

12. The method of claim 1, wherein the identifying step identifies storage space in a computer-accessible storage medium as the limited resource, the step of creating an availability representation stores a representation of storage medium space available for use, and the step of creating a demand representation stores a representation of storage medium space which is at least tentatively allocated for use.

13. The method of claim 1, wherein the identifying step identifies a supply of a currency instrument as the limited resource, the step of creating an availability representation stores a representation of the currency instrument available for use, and the step of creating a demand representation stores a representation of the currency instrument which is at least tentatively allocated for use.

14. The method of claim 13, wherein the currency instrument includes a stock.

15. The method of claim 13, wherein the currency instrument includes a bond.

16. A method for monitoring resource status based on availability and demand, the method comprising the computer-implemented steps of:

identifying a limited resource;

creating in memory an availability representation which represents the availability of the limited resource;

creating in memory a demand representation which represents the demand for the limited resource; and producing a resource status indicator by combining the availability representation and the demand representation, wherein the step of creating an availability representation stores an enumerated availability value in memory, the step of creating a demand representation stores an enumerated demand value in memory, and the producing step performs a lookup based on the enumerated availability value and the enumerated demand value.

17. The method of claim 16, further comprising the step of manifesting the resource status indicator in a visual interface, wherein the manifesting step manifests changes along a single independent axis of a hue-saturation-value multi-axial color space by changing a color saturation in the visual interface to reflect changes in the resource status indicator.

18. The method of claim 17, wherein the manifesting step changes a color hue in the visual interface to reflect changes in the resource status indicator.

19. The method of claim 17, wherein the manifesting step changes a texture in the visual interface to reflect changes in the resource status indicator.

20. The method of claim 17, wherein the manifesting step changes a region size in the visual interface to reflect changes in the resource status indicator.

21. The method of claim 17, wherein the manifesting step changes a region boundary in the visual interface to reflect changes in the resource status indicator.

22. The method of claim 17, wherein the manifesting step changes a pixel alpha channel value in the visual interface to reflect changes in the resource status indicator.

23. A method for monitoring resource status based on availability and demand, the method comprising the computer-implemented steps of:

identifying a limited resource;

creating in memory an availability representation which represents the availability of the limited resource;

creating in memory a demand representation which represents the demand for the limited resource; and producing a resource status indicator by combining the availability representation and the demand representation, wherein the step of creating an availability representation stores an enumerated availability value in memory, the step of creating a demand representation stores an enumerated demand value in memory, and the producing step performs a functional mapping based on the enumerated availability value and the enumerated demand value.

24. The method of claim 23, wherein the functional mapping is piecewise continuous.

25. The method of claim 23, further comprising the step of manifesting the resource status indicator in a visual interface, wherein the manifesting step manifests changes along a single independent axis of a hue-saturation-value multi-axial color space by changing a color saturation in the visual interface to reflect changes in the resource status indicator.

26. The method of claim 25, wherein the manifesting step changes a color hue in the visual interface to reflect changes in the resource status indicator.

27. The method of claim 25, wherein the manifesting step changes a color value in the visual interface to reflect changes in the resource status indicator.

28. The method of claim 25, wherein the manifesting step changes a texture in the visual interface to reflect changes in the resource status indicator.

29. A method for monitoring resource status based on availability and demand, the method comprising the computer-implemented steps of:

identifying a limited resource;

creating in memory an availability representation which represents the availability of the limited resource;

creating in memory a demand representation which represents the demand for the limited resource; and producing a resource status indicator by combining the availability representation and the demand representation, wherein the identifying step identifies time as the limited resource, the step of creating an availability representation stores a representation of time available for allocation between tasks and appointments, and the step of creating a demand representation stores a representation of time demanded for tasks in relation to time demanded for appointments.

30. The method of claim 29, wherein time for tasks and time for appointments are represented in separate structures which have the same format.

31. The method of claim 29, further comprising the step of manifesting the resource status indicator in a visual interface, wherein the manifesting step manifests changes along a single independent axis of a hue-saturation-value multi-axial color space by changing a color saturation in the visual interface to reflect changes in the resource status indicator.

32. The method of claim 31, wherein the manifesting step changes a region size in the visual interface to reflect changes in the resource status indicator.

33. The method of claim 31, wherein the manifesting step changes a region boundary in the visual interface to reflect changes in the resource status indicator.

34. The method of claim 31, wherein the manifesting step changes a pixel alpha channel value in the visual interface to reflect changes in the resource status indicator.

35. A computer system comprising:
   means for identifying a limited resource;
   means for creating in a computer memory an availability representation which represents the availability of the limited resource;
   means for creating in a computer memory a demand representation which represents the demand for the limited resource; and
   means for producing a resource status indicator by using at least a computer processor to combine the availability representation and the demand representation, wherein the means for identifying identifies time as the limited resource, the means for creating an availability representation stores a representation of time available for allocation between tasks and appointments, and the means for creating a demand representation stores a representation of time demanded for tasks in relation to time demanded for appointments.

36. The computer system of claim 35, wherein the means for producing a resource status indicator produces an event density measure.

37. The computer system of claim 35, further comprising means for manifesting the resource status indicator in a visual interface, wherein the means for manifesting the resource status indicator changes a color saturation in the visual interface to reflect changes in the resource status indicator.

38. The computer system of claim 37, wherein the means for manifesting the resource status indicator changes a color hue in the visual interface to reflect changes in the resource status indicator.

39. The computer system of claim 37, wherein the means for manifesting the resource status indicator changes a color value in the visual interface to reflect changes in the resource status indicator.

40. The computer system of claim 37, wherein the means for manifesting the resource status indicator changes a texture in the visual interface to reflect changes in the resource status indicator.

41. The computer system of claim 37, wherein the means for manifesting the resource status indicator changes a region size in the visual interface to reflect changes in the resource status indicator.

42. The computer system of claim 37, wherein the means for manifesting the resource status indicator changes a region boundary in the visual interface to reflect changes in the resource status indicator.

43. The computer system of claim 37, wherein the means for manifesting the resource status indicator changes a pixel alpha channel value in the visual interface to reflect changes in the resource status indicator.

44. A computer storage medium having a configuration that represents data and instructions which will cause at least a portion of a computer system to perform method steps for monitoring a resource, the method comprising the steps of:
   identifying a limited resource;
   creating in memory an availability representation which represents the availability of the limited resource;
   creating in memory a demand representation which represents the demand for the limited resource; and
   producing a resource status indicator by combining the availability representation and the demand representation wherein the step of creating an availability representation stores an enumerated availability value in memory, the step of creating a demand representation stores an enumerated demand value in memory, and the producing step performs a functional mapping based on the enumerated availability value and the enumerated demand value.

45. The storage medium of claim 44, wherein the method further comprises the step of manifesting the resource status indicator in a visual interface, wherein the manifesting step manifests changes along a single independent axis of a hue-saturation-value multi-axial color space by changing a color saturation in the visual interface to reflect changes in the resource status indicator.

46. The storage medium of claim 45, wherein the manifesting step changes a color hue in the visual interface to reflect changes in the resource status indicator.

47. The storage medium of claim 45, wherein the manifesting step changes a color value in the visual interface to reflect changes in the resource status indicator.

48. The storage medium of claim 45, wherein the manifesting step changes a texture in the visual interface to reflect changes in the resource status indicator.

49. The storage medium of claim 45, wherein the manifesting step changes a region size in the visual interface to reflect changes in the resource status indicator.

50. The storage medium of claim 45, wherein the manifesting step changes a pixel alpha channel value in the visual interface to reflect changes in the resource status indicator.

51. A computer storage medium having a configuration that represents data and instructions which will cause at least a portion of a computer system to perform method steps for monitoring a resource, the method comprising the steps of:
   identifying a limited resource;
   creating in memory an availability representation which represents the availability of the limited resource;
   creating in memory a demand representation which represents the demand for the limited resource; and
   producing a resource status indicator by combining the availability representation and the demand representation, wherein the step of creating an availability representation stores an enumerated availability value in memory, the step of creating a demand representation stores an enumerated demand value in memory, and the producing step performs a lookup based on the enumerated availability value and the enumerated demand value.

52. The storage medium of claim 51, wherein the method further comprises the step of manifesting the resource status indicator in a visual interface, wherein the manifesting step manifests changes along a single independent axis of a hue-saturation-value multi-axial color space by changing a color saturation in the visual interface to reflect changes in the resource status indicator.

53. The storage medium of claim 52, wherein the manifesting step changes a color hue in the visual interface to reflect changes in the resource status indicator.

54. The storage medium of claim 52, wherein the manifesting step changes a color value in the visual interface to reflect changes in the resource status indicator.

55. The storage medium of claim 52, wherein the manifesting step changes a texture in the visual interface to reflect changes in the resource status indicator.

56. The storage medium of claim 52, wherein the manifesting step changes a region boundary in the visual interface to reflect changes in the resource status indicator.

57. The storage medium of claim 52, wherein the manifesting step changes a pixel alpha channel value in the visual interface to reflect changes in the resource status indicator.

58. A computer storage medium having a configuration that represents data and instructions which will cause at least a portion of a computer system to perform method steps for monitoring a resource, the method comprising the steps of:

identifying a limited resource;

creating in memory an availability representation which represents the availability of the limited resource;

creating in memory a demand representation which represents the demand for the limited resource; and producing a resource status indicator by combining the availability representation and the demand representation, wherein the step of creating an availability representation stores a numeric availability value in memory, the step of creating a demand representation stores a numeric demand value in memory, and the producing step forms a ratio from the numeric availability value and the numeric demand value.

* * * * *